(12) United States Patent
Yasaki et al.

(10) Patent No.: US 10,341,346 B2
(45) Date of Patent: Jul. 2, 2019

(54) INFORMATION PROCESSING METHOD, INFORMATION PROCESSING APPARATUS, AND STORAGE MEDIUM

(71) Applicant: FUJITSU LIMITED, Kawasaki-shi, Kanagawa (JP)

(72) Inventors: Koichi Yasaki, Kawasaki (JP); Hidenobu Ito, Kawasaki (JP); Takuya Sakamoto, Kawasaki (JP); Yosuke Nakamura, Kawasaki (JP); Kazuaki Nimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 137 days.

(21) Appl. No.: 14/954,000

(22) Filed: Nov. 30, 2015

(65) Prior Publication Data

US 2016/0156629 A1    Jun. 2, 2016

(30) Foreign Application Priority Data

Dec. 2, 2014 (JP) .................................. 2014-244160

(51) Int. Cl.
*H04L 29/06* (2006.01)
*G06F 13/10* (2006.01)

(52) U.S. Cl.
CPC ............ *H04L 63/10* (2013.01); *G06F 13/102* (2013.01)

(58) Field of Classification Search
CPC ..... H04L 63/10; H04L 63/101; H04L 63/102; H04L 63/105; G06F 13/102
See application file for complete search history.

(56) References Cited

U.S. PATENT DOCUMENTS

| 8,875,243 | B1* | 10/2014 | Cherukumudi | ....... H04L 63/168 |
| | | | | 713/168 |
| 2004/0083015 | A1 | 4/2004 | Patwari | |
| 2004/0210897 | A1* | 10/2004 | Brockway | ............ G06F 9/4411 |
| | | | | 717/174 |
| 2005/0097248 | A1 | 5/2005 | Kelley | |
| 2009/0089426 | A1* | 4/2009 | Yamasaki | ......... H04L 29/12066 |
| | | | | 709/225 |
| 2010/0146506 | A1* | 6/2010 | Lee | ......................... G06F 9/455 |
| | | | | 718/1 |
| 2013/0297830 | A1* | 11/2013 | Pao | ....................... G06F 13/102 |
| | | | | 710/3 |
| 2014/0380425 | A1* | 12/2014 | Lockett | ................... H04L 63/20 |
| | | | | 726/4 |
| 2015/0264108 | A1* | 9/2015 | Ji | ..................... G06F 17/30899 |
| | | | | 709/219 |

FOREIGN PATENT DOCUMENTS

JP    2006-524973    11/2006
JP    2010-152917    7/2010

* cited by examiner

*Primary Examiner* — Joseph P Hirl
*Assistant Examiner* — Chi D Nguy
(74) *Attorney, Agent, or Firm* — Staas & Halsey LLP

(57) ABSTRACT

An information processing method executed in a computer, the processing method including: starting a network application that belongs to a specified network domain, starting a security application that restricts accesses from the network application except for specified accesses including accesses within same network domain, detecting a peripheral device coupled to the computer, and generating an interface for accessing to the detected peripheral device so that the generated interface belongs to the same specified network domain as the network application.

10 Claims, 15 Drawing Sheets

FIG. 6

| SSID | MAC ADDRESS |
|---|---|
| Uyychy | 11:22:33:44:555:66 |
| Aabnch | 66:55:44:33:22:11 |
| NONE | Aa:bb:cc:dd:ee:ff |

FIG. 7

| TERMINAL ID | GADGET A | GADGET B | ... | GADGET Z |
|---|---|---|---|---|
| 356Hgiert | O(ONLY app1) | O | ... | × |
| ... | ... | ... | ... | ... |
| ⋮ | ⋮ | ⋮ | ⋮ | ⋮ |

FIG. 8

| GADGET NAME | SSID | PASSWORD | MAC ADDRESS | CONNECTION METHOD | DRIVER NAME |
|---|---|---|---|---|---|
| GADGET A | Abcdefg | Qwertyu | 12:23:34:45:67:89 | WPA | DRIVER A |
| GADGET B | gfedcba | poiuyt | 98:76:54:34:23:12 | WAP | DRIVER B |
| GADGET C | | | ... | BLT | DRIVER C |

FIG. 9

| TERMINAL ID | AUTHENTICATION METHOD | AUTHENTICATION INFORMATION |
|---|---|---|
| 356Hgiert | PUBLIC KEY BASE (RSA SYSTEM) | PUBLIC KEY OF RSA |
| ⋮ | ⋮ | ⋮ |

FIG. 11

```
                                                    ╭ 510
┌─────────────────────────────────────────────────────────────┐
│ Var port=$PORT$  ─── 511                                    │
│ Takephoto(){  ─── 512                                       │
│    Ajax.open(http://IP():port/<API1 PUBLISHED BY GADGET>) ──── 513
│    Ajax.send(<ARGUMENT OF API1 PUBLISHED BY GADGET>)      ──── 514
│                                                             │
│ StartRecording(){                                           │
│    Ajax.open(http://IP():port/<API2 PUBLISHED BY GADGET>) ──── 523
│    Ajax.send(<ARGUMENT OF API2 PUBLISHED BY GADGET>)      ──── 524
│ )                                                           │
└─────────────────────────────────────────────────────────────┘
```

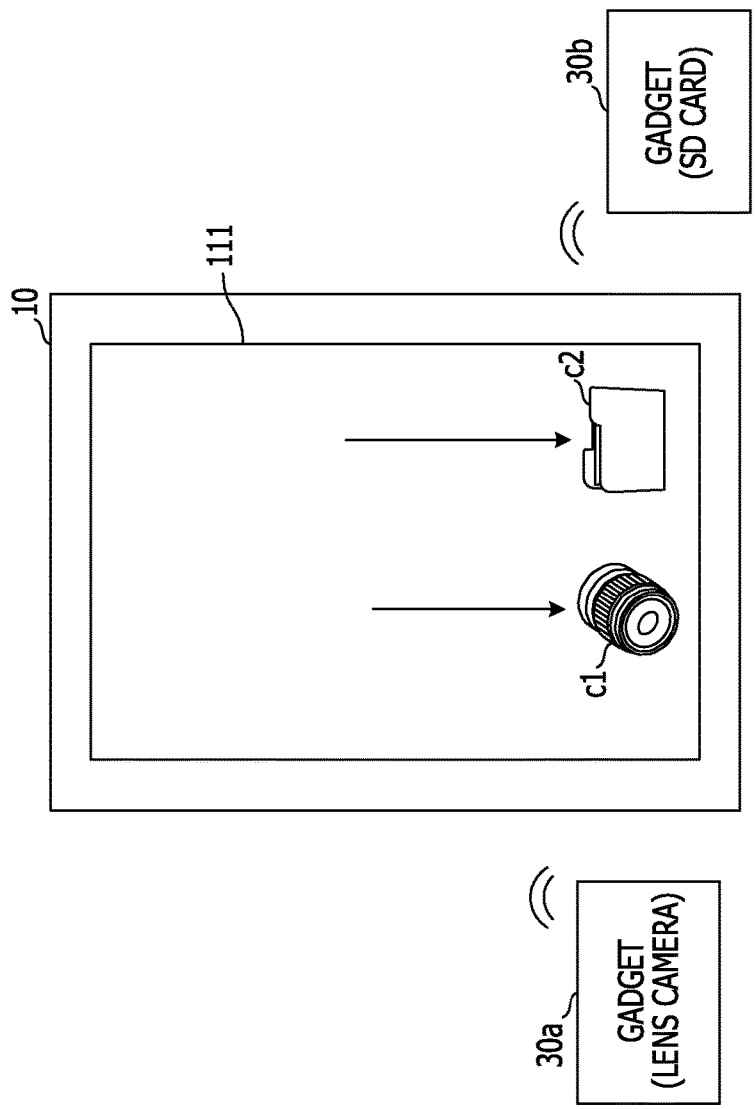

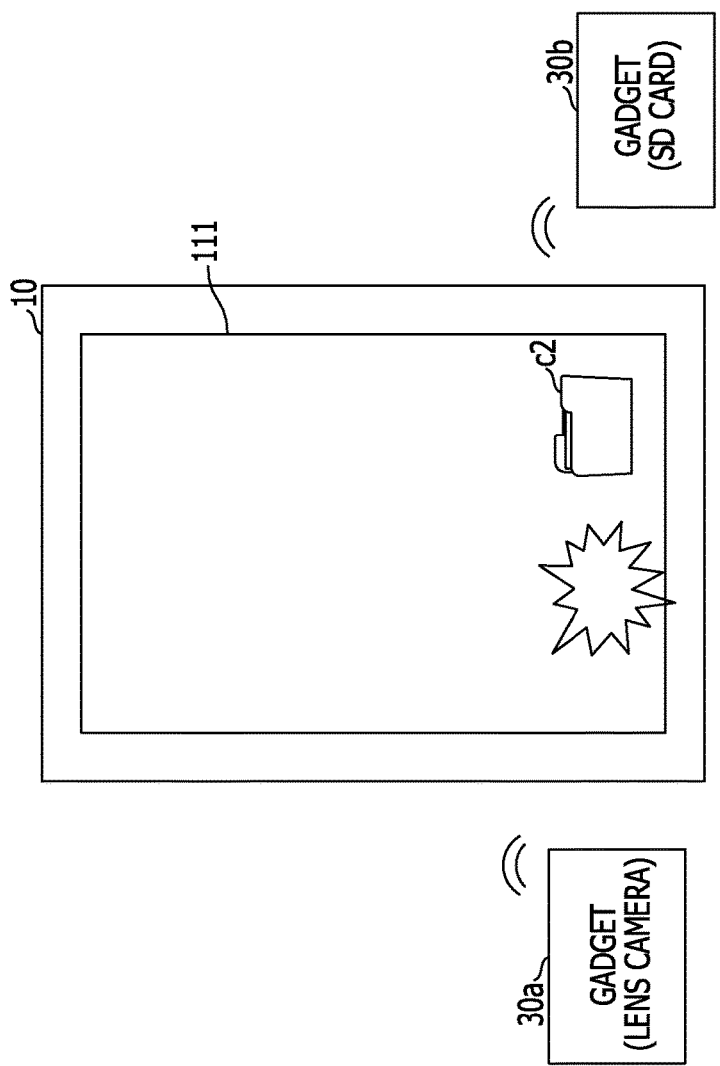

INFORMATION PROCESSING METHOD, INFORMATION PROCESSING APPARATUS, AND STORAGE MEDIUM

CROSS-REFERENCE TO RELATED APPLICATION

This application is based upon and claims the benefit of priority of the prior Japanese Patent Application No. 2014-244160, filed on Dec. 2, 2014, the entire contents of which are incorporated herein by reference.

FIELD

The embodiments discussed herein are related to an information processing method, an information processing apparatus, and a storage medium.

BACKGROUND

External devices capable of cooperating with a smart terminal, such as a smart phone, or the like are increasing in number. As an example of an external device capable of cooperating with a smart terminal, a peripheral device capable of expanding a camera function, a storage function, or a display function, or the like of a smart terminal is given. In the following, an external device capable of cooperating with a smart terminal is referred to as a "gadget".

When a gadget is connected to a smart terminal, authentication has to be performed. For example, in the case of a wireless-LAN type gadget, authentication is performed using an SSID and a password that are manually input by a user into the smart terminal. Also, there are some gadgets in which authentication is performed by a near field communication (NFC) touch or a simultaneous button method. A password used for authentication is stored between a smart terminal and a gadget, and thus authentication becomes unnecessary at the time of reconnection.

On the other hand, a change has been arising in applications that is connected to a gadget, and that provides services. For example, the development language of applications are shifting from native languages, such as Java (registered trademark), Object-C, or C++, and the like to HyperText Markup Language (HTML), Cascading Style Sheets (CSS), and JavaScript (registered trademark), and the like. HTML, CSS, and JavaScript (registered trademark), and the like have a low dependency on a platform, such as an operating system (OS), and the like, and thus one kind of source code is allowed to be used on a plurality of platforms. In this regard, applications formed by HTML, CSS, and JavaScript (registered trademark), and the like are referred to as Web applications (hereinafter referred to as "Web apps"). The Web apps are classified into Hosted Apps, and Packaged Web apps.

Hosted Apps are Web apps that are returned from the Web server when a Web browser accesses a Web server. On the other hand, Packaged Web apps are Web apps that are produced by putting together files included in Web apps, such as HTML, CSS, and JavaScript (registered trademark), or the like in a form of a package, and are distributed and installed in a local environment of a user terminal. Packaged Web apps are in common with Hosted Apps on the point that they both operate on a Web browser. However, Packaged Web apps are able to be performed as offline Web apps. In the following, applications that are simply referred to as "Web apps" are Packaged Web apps.

HTML, CSS, and JavaScript (registered trademark), and the like, which are said to be development languages of Web apps, are languages that have been developed in the Internet environment, and thus an IP address is involved in invoking a service application program interface (API), and the like. Regarding a gadget, in view of such a background, an API based on an IP address (API based on a representational state transfer (REST)) is published. For example, the following uniform resource locators (URLs) are examples of APIs that are published by gadgets, respectively.

http://<ip address of gadget>/api3/PW?x=<pwd>&m=1
http://<ip address of gadget>/api/1.0/data transmitted by POST message{"method":"shot","params",[ ]}

Related-art techniques are disclosed in Japanese National Publication of International Patent Application No. 2006-524973, and Japanese Laid-open Patent Publication No. 2010-152917.

SUMMARY

According to an aspect of the invention, an information processing method executed in a computer, the processing method includes starting a network application that belongs to a specified network domain, starting a security application that restricts accesses from the network application except for specified accesses including accesses within same network domain, detecting a peripheral device coupled to the computer, and generating an interface for accessing to the detected peripheral device so that the generated interface belongs to the same specified network domain as the network application.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a detection list;

FIG. 7 is a diagram illustrating an example of a configuration of a cooperation information storage unit;

FIG. 8 is a diagram illustrating an example of a configuration of a gadget list storage unit;

FIG. 9 is a diagram illustrating an example of a configuration of a terminal information storage unit;

FIG. 11 is a diagram illustrating an example of definition contents of a driver;

FIG. 12 is a diagram illustrating a display example of icons corresponding to gadgets, respectively;

FIG. 13 is a diagram illustrating an example in which an icon is deleted when the corresponding driver is disabled;

DESCRIPTION OF EMBODIMENTS

An API of a wireless-LAN type gadget is invoked through a wireless LAN. Accordingly, in order for a Web application to invoke an API of a gadget, the Web application has to have an access right to the wireless LAN. In a smart terminal, an access right to a wireless LAN is set by a user for each application. However, in the case of a Web application, a Web browser, which is an execution platform thereof is targeted for receiving the access right. Accordingly, if an access right to a wireless LAN is given to a Web browser, all the Web applications operating on the Web browser becomes accessible to the gadget.

However, it is thought that there are cases where a Web application that is allowed to access a certain gadget ought to be limited only to a specific Web application. For example, when a gadget used in a company stores confidential information, such as company information, or the like, if an unspecified Web application is allowed to access the gadget, the confidential information might be externally exposed.

As one method of restricting external accesses by a Web application, Content Security Policy (CSP) is provided, which may be referred as "security application". In CSP, a list of IP addresses that are allowed by each Web application is provided as a white list. CSP is adopted by Packaged Web Applications as a standard. Thus, it is thought that accesses to a certain gadget are limited only to a specific Web application using CSP. That is to say, by including the IP address of the gadget in the white lists of some Web applications, and by not including the IP address in the white lists of the other Web applications, it is possible to limit Web applications that are allowed to access the gadget to a specific Web application.

However, depending on a gadget, it sometimes occurs in the gadget that the IP address system thereof changes every time a smart terminal and the gadget establish a connection. The IP address of such a gadget is not determined until connection establishment with the smart terminal is completed. Accordingly, for a CSP-protected Web application, in order to allow access to such a gadget, every time an IP address is determined (that is to say, every time a connection is established), the relevant IP address has to be set in the white list of the Web application. In order to update a white list, a Web application corresponding to the white list is requested to be stopped. Accordingly, when the number of gadgets connected to a smart terminal is increased, a Web application is stopped frequently, and thus the operationality of the smart terminal might be deteriorated.

Thus, according to an embodiment of the present disclosure, it is desirable to facilitate cooperation between a Web application and an external device.

Figure 1:
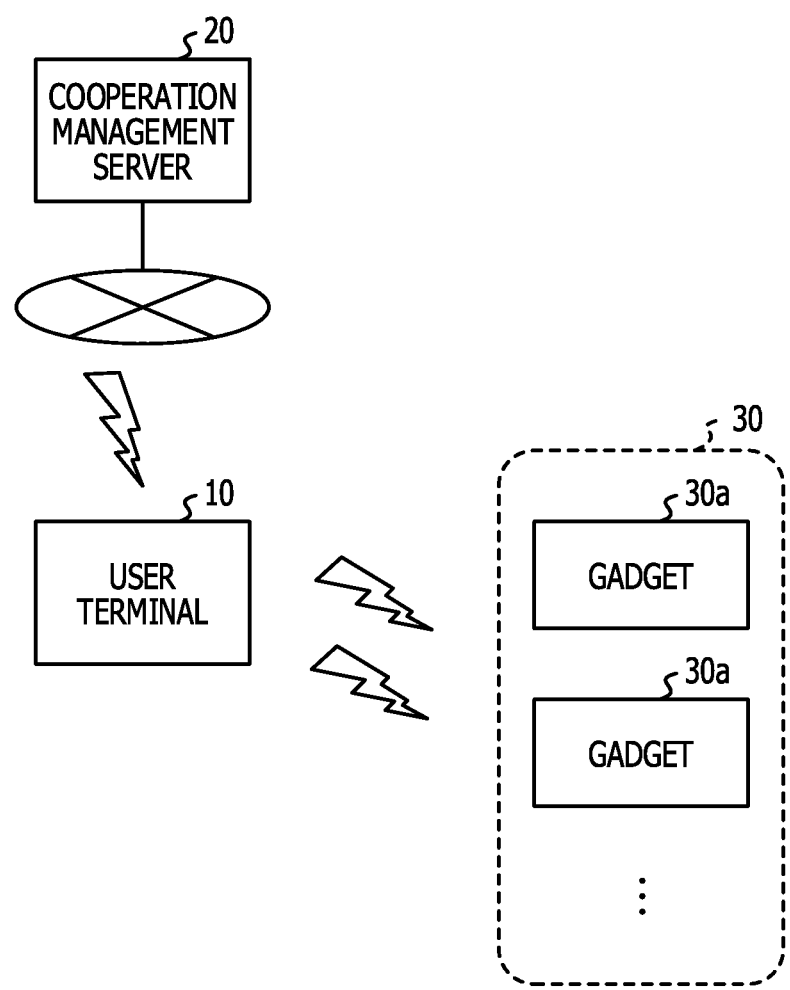
FIG. 1 is a diagram illustrating an example of a system configuration according to an embodiment of the present disclosure.

In the following, a description will be given of embodiments of the present disclosure with reference to the drawings. FIG. 1 is a diagram illustrating an example of a system configuration according to an embodiment of the present disclosure. In FIG. 1, a cooperation management server 20 is capable of communicating with one or more user terminals 10 through wireless communication, such as a wireless local area network (LAN), or the like. Also, one of the user terminals 10 is capable of communicating with one or more gadgets 30 such as a gadget 30a, a gadget 30b, and the like through wireless communication, such as wireless LAN or BlueTooth (registered trademark), or the like. In this regard, for the sake of convenience of the explanation, it is assumed that the system configuration illustrated in FIG. 1 is built in a certain company (hereinafter referred to as "company A").

Each of the user terminal 10 is a terminal directly operated by a user. As an example of the user terminals 10, a smart terminal, such as a smart phone, a tablet terminal, or the like is given. However, the other kinds of information processing apparatuses that are capable of wireless communication, such as a personal computer (PC), or the like may be used as the user terminals 10. In the present embodiment, the user terminals 10 execute cooperation processing with the gadgets 30 through wireless communication. In this regard, the users of the user terminals 10 are employees of the company A, for example.

The gadgets 30 are examples of external devices that cooperate with the user terminals 10. For example, a peripheral device capable of expanding a camera function, a storage function, or a display function, or the like of the user terminals 10 may be used as the gadgets 30. Alternatively, home electrical appliances, such as an air conditioner, and the like may be used as the gadgets 30.

The cooperation management server 20 is a computer that manages requisite information for each of the user terminals 10 to cooperate with the gadgets 30 (accessing the gadgets 30), and information indicating the gadgets 30 allowed to cooperate with (access) a Web application (hereinafter referred to as a "Web appli") installed in each of the user terminals 10, and the like. That is to say, in the present embodiment, a system administrator in the company A determines a Web application that is allowed to cooperate with each gadget 30 among the Web applications installed in each user terminal 10.

In this regard, the Web application is an application including HyperText Markup Language (HTML), Cascading Style Sheets (CSS), and JavaScript (registered trademark), or the like as a component. In the present embodiment, the Web application represents a Web application of a Packaged Web apps type.

Figure 2:
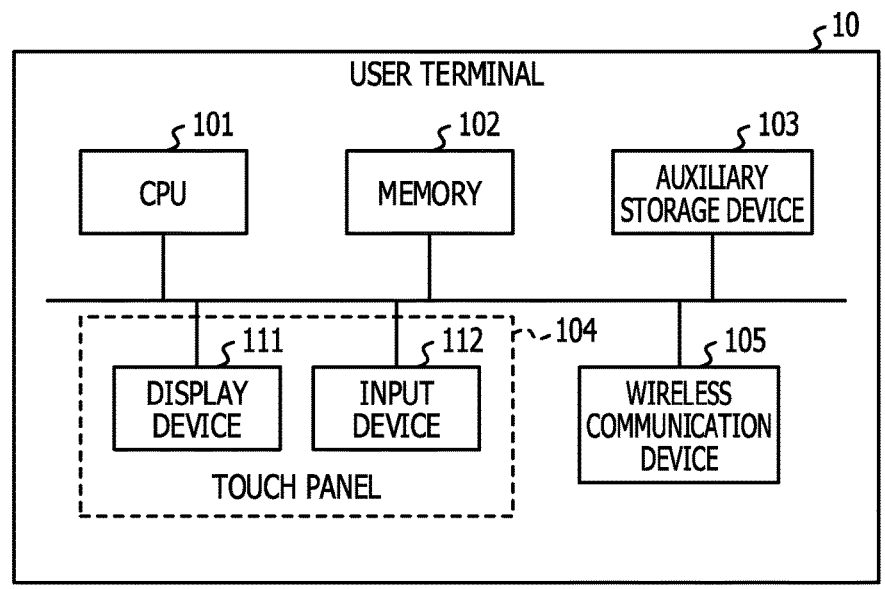
FIG. 2 is a diagram illustrating an example of a hardware configuration of a user terminal according to the present embodiment.

FIG. 2 is a diagram illustrating an example of a hardware configuration of a user terminal according to the present embodiment. In FIG. 2, the user terminal 10 includes a CPU 101, a memory 102, an auxiliary storage device 103, a touch panel 104, and a wireless communication device 105, and the like.

The auxiliary storage device 103 stores a program installed in the user terminal 10, and the like. The memory 102 reads the program from the auxiliary storage device 103, and stores the program when a start instruction of the program is given. The CPU 101 achieves the function related to the user terminal 10 in accordance with the program stored in the memory 102.

The touch panel 104 is an electronic part provided with both an input function and a display function, and performs displaying information and accepting input from a user, and the like. The touch panel 104 includes a display device 111, an input device 112, and the like.

The display device 111 is a liquid crystal display, or the like, and has a display function of the touch panel 104. The input device 112 is an electronic part including a sensor that detects contact of a contact object on the display device 111. The method of detecting contact by a contact object may be any one of publicly known methods, such as an electrostatic method, a resistive film method, an optical method, or the like. In this regard, the contact object represents an object that touches the contact face (surface) of the touch panel 104. As an example of such an object, a finger of a user, an ordinary pen, or the like is given.

The wireless communication device 105 is an electronic part requisite for performing wireless communication.

Figure 3:
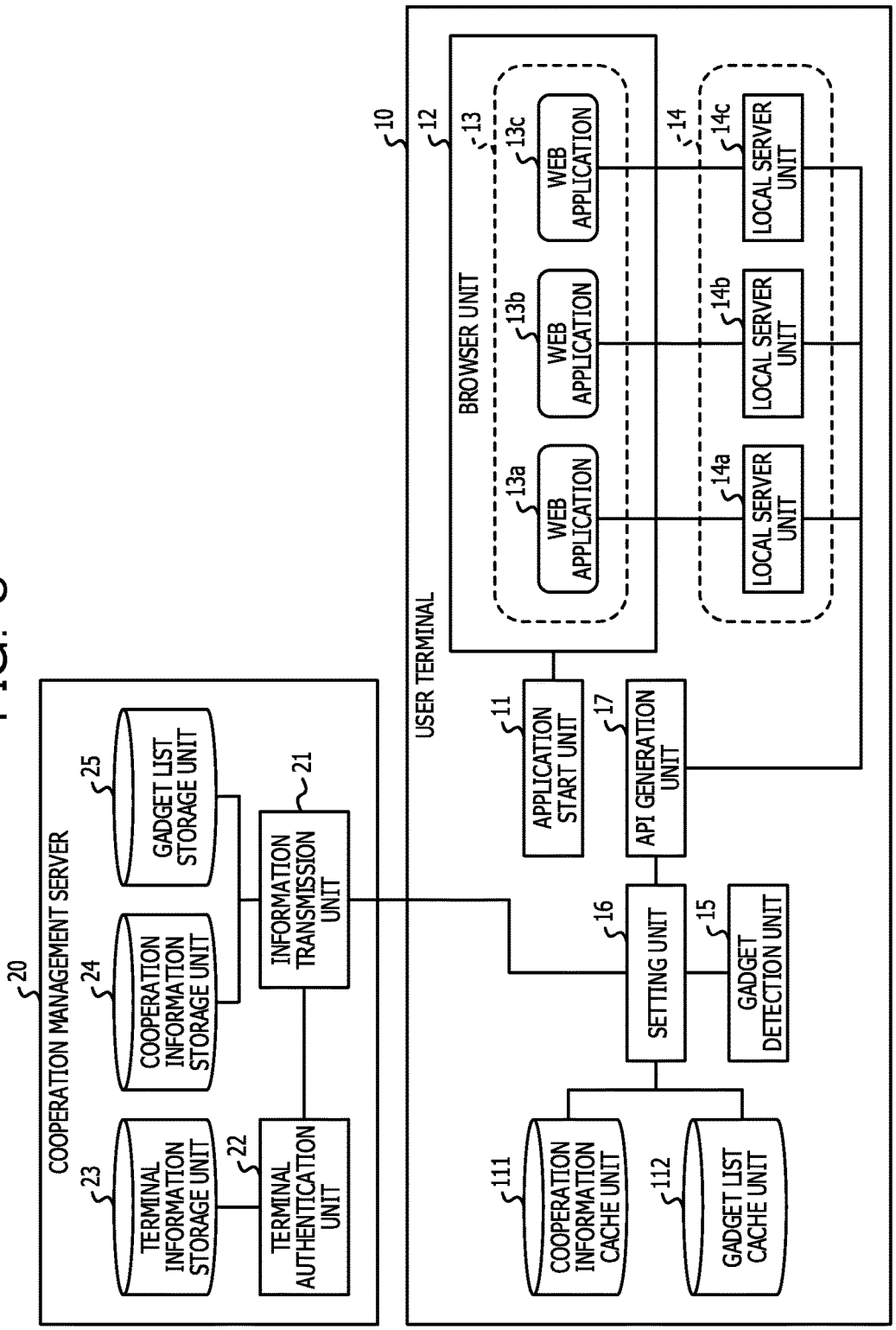
FIG. 3 is a diagram illustrating an example of functional configurations of a cooperation management server, and the user terminal according to an embodiment of the present disclosure.

FIG. 3 is a diagram illustrating an example of functional configurations of the cooperation management server, and the user terminal according to an embodiment of the present disclosure. In FIG. 3, the cooperation management server 20 includes an information transmission unit 21, and a terminal authentication unit 22. Each of the units is achieved by the program installed in the cooperation management server 20 that is executed by the CPU of the cooperation management server 20. The cooperation management server 20 also uses a terminal information storage unit 23, a cooperation information storage unit 24, a gadget list storage unit 25, and the like. Each of the storage units is allowed to be achieved by an auxiliary storage device of the cooperation management server 20, a storage device capable of connecting to the cooperation management server 20 through a network, or the like.

The information transmission unit 21 returns information (hereinafter referred to as "cooperation information") stored in the cooperation information storage unit 24, and information (hereinafter referred to as "gadget list information") stored in the gadget list storage unit 25 in response to a request from the user terminal 10. The cooperation information is information indicating a Web application 13 that is allowed to cooperate with each of the gadgets 30 (access is allowed to each of the gadgets 30) among Web applications 13 installed in the user terminal 10. The gadget list information is a list of gadget information for each of the gadgets 30. The gadget information is requisite information for the user terminal 10 to communicate with a gadget 30. For example, a service set identifier (SSID), a password, and the like are included in the gadget information.

The terminal authentication unit 22 performs authentication on a user terminal 10 that requests the cooperation information and the gadget list information. The authentication is performed with reference to the terminal information storage unit 23.

The user terminal 10 includes an application start unit 11, a browser unit 12, one or more Web applications 13, such as Web applications 13a, 13b, 13c, and the like, local server units 14 for the corresponding Web applications 13, such as local server units 14a, 14b, and 14c, and the like, a gadget detection unit 15, a setting unit 16, an API generation unit 17, and the like. Each of these units is achieved by processing of the CPU 101 by executing one or more programs installed in the user terminal 10. The user terminal 10 also includes storage units, such as a cooperation information cache unit 111, a gadget list cache unit 112, and the like. It is possible to achieve these storage units using an auxiliary storage device 103, a memory 102, or the like.

The application start unit 11 executes start processing of a Web application 13 selected to start among the Web applications 13 installed in the user terminal 10. The application start unit 11 assigns a combination of an IP address and a port number (that is to say, a uniform resource locator (URL)) to content data of the Web application 13 to be started in the process of the start processing of the Web application 13. The content data of the Web application 13 is a set of an HTML file, a CSS file, a JavaScript (registered trademark) file, and the like, and is stored in the auxiliary storage device 103. The application start unit 11 also generates a thread of the local server unit 14 corresponding to the Web application 13 to be started in the start processing.

The browser unit 12 functions as a Web browser. The browser unit 12 is also an execution environment of a Web application 13. That is to say, the browser unit 12 analyzes the contents of the content data of the Web application 13, performs image display based on the content data, and executes processing based on the content data, and the like. In this regard, in the present embodiment, the browser unit 12 restricts external access by each of the Web applications 13 based on the Content Security Policy (CSP). Accordingly, access destinations by each of the Web applications 13 are basically limited to the IP addresses included in a white list for each of the Web applications 13.

The local server unit 14 functions as a Web server in the user terminal 10. That is to say, the local server unit 14 generates (opens) a socket communication port (hereinafter referred to as a "server port"), and waits for a HyperText Transfer Protocol (HTTP) request to a server port. When the local server unit 14 receives an acquisition request (HTTP request) of content data of a Web application 13 from the browser unit 12 through a server port, the local server unit 14 returns a response (HTTP response) including the content data to the browser unit 12. The IP address of the server port of a certain local server unit 14 is the same as the IP address that the local server unit 14 assigns to the content data of the corresponding Web application 13. Accordingly, in an acquisition request of content data, the IP address assigned to the content data is specified. Accordingly, the browser unit 12 recognizes that the download source of the content data is the Web application 13 that belongs to a domain (network domain) related to the IP address.

The local server unit 14 also mediates or acts for access by the Web application 13 to the gadget 30. Specifically, the local server unit 14 generates (opens) a socket communication port (hereinafter referred to as an "API port") as an interface for accepting an access request from the Web application 13 to the gadget 30. The API port is generated in each of the local server units 14 for each of the gadgets 30. The same IP address as that of the content data of the Web application 13 corresponding to the local server unit 14 is assigned to the API port. That is to say, the application start unit 11 assigns the substantially same IP address to the content data of the Web application 13 and the API port of the local server unit 14 corresponding to the Web application 13.

The access destination of the Web application 13 is basically limited to the range of the white list (white list of the CSP) corresponding to the Web application 13 by the browser unit 12. However, a same-origin policy is effective in the CSP. That is to say, the browser unit 12 permits access by the Web application 13 if the access destination is within the range of the domain related to the IP address of the origin (the download source of content data) of the Web application 13 regardless of the white list. Accordingly, if a certain Web application 13 attempts to access the API port of the local server unit 14 corresponding to the Web application 13, the access is permitted by the browser unit 12. This is because the access corresponds to an access within the domain as the origin of the Web application 13 when viewed from the browser unit 12.

When the Web application 13 accesses a certain API port of the local server unit 14, an access is made to the gadget 30 corresponding to the API port. That is to say, a method included in the API published by the gadget 30 is invoked. As a result, it is possible for the Web application 13 to substantially access the gadget 30. In this regard, among the methods included in the API published by the gadget 30, the method to be invoked by the local server unit 14 is specified by the cooperation source Web application 13 of the API port.

The gadget detection unit 15 detects the existence of a gadget 30 through wireless communication. When the gadget detection unit 15 detects a gadget 30, the setting unit 16 downloads the cooperation information and the gadget list information from the cooperation management server 20. The downloaded information is stored in the cooperation information cache unit 111 or the gadget list cache unit 112.

The setting unit 16 also requests the API generation unit 17 to generate an API port corresponding to the detected gadget 30. The API generation unit 17 identifies the Web application 13 whose access to the detected gadget 30 is allowed, and requests the local server unit 14 corresponding to the Web application 13 to generate an API port corresponding to the gadget 30.

Figure 4:
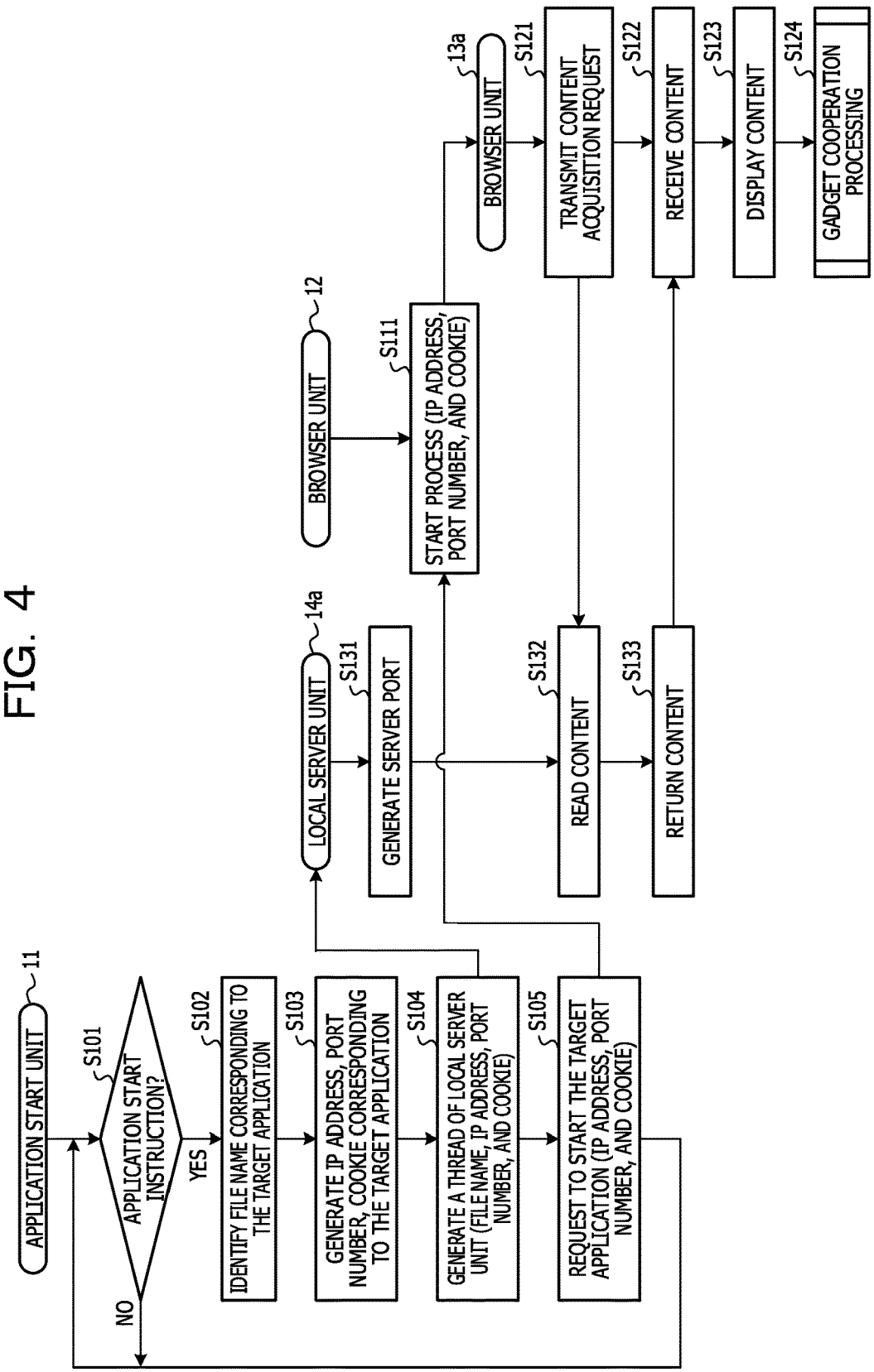
FIG. 4 is an explanatory diagram of an example of a processing procedure of start processing of a Web application.

In the following, a description will be given of a processing procedure executed by the user terminal 10. FIG. 4 is an explanatory diagram of an example of a processing procedure of start processing of a Web appli.

For example, when an icon displayed on the display device 111 is selected, or the like so that a start instruction of the Web application 13 related to the icon is input (Yes in S101), the application start unit 11 identifies the identification name of the storage location of the content data of the Web application 13 (here, the Web application 13a is assumed) to be started (S102). The identification name of the storage location is a file name or a folder name, for example. Here, it is assumed that the file name of the archive file that stores the content data is used as an identification name of the storage location. In this regard, the file name is stored in the user terminal 10 in association with the icon of the Web application 13.

Next, the application start unit 11 generates an IP address, a port number, and a cookie that correspond to the Web application 13a. The IP address and the port number are assigned such that they are not duplicated among the individual Web applications 13. The cookie is information for use in authentication of the Web application 13a, such as a password. Accordingly, a value that is not duplicated among the individual Web applications 13 is generated for the cookie. In this regard, the IP address and the port number corresponding to the Web application 13a is the IP address and the port number of the content data of the Web application 13a.

Next, the application start unit 11 generates a thread of the local server unit 14a corresponding to the Web application 13a (S104). The file name identified in step S102, and the IP address, the port number, and the cookie generated in step S103 are set in the local server unit 14a. When the local server unit 14a is started, the local server unit 14a generates (establishes) a server port corresponding to the set IP address and port number (S131), and waits for access to the server port.

Next, the application start unit 11 requests the browser unit 12 to start the Web application 13a with specifying the IP address, the port number, and the cookie of the Web application 13a (S105).

The browser unit 12 generates a process that functions as the Web application 13a in response to the start request of the Web application 13a (S111). The IP address, the port number, and the cookie of the Web application 13a are set in the process. In this regard, the process is a child process of the process as the browser unit 12. Accordingly, the process is said to be a part of the browser unit 12 (part functioning as the Web application 13a in the browser unit 12). However, in the following, a description will be given on the assumption that the Web application 13a is an execution entity on the processing executed by the process. In this regard, each of the Web applications 13 may be started as a thread. Whether the browser unit 12 starts a process for each of the Web applications 13 or starts a thread depends on the implementation of the browser unit 12.

When the Web application 13a is started, the Web application 13a transmits an acquisition request (HTTP request) of the content data to the server port related to the IP address and the port number set by the browser unit 12 (S121). When the local server unit 14a receives the acquisition request through the server port, the local server unit 14a reads the content data from the file related to the file name set in step S104 (S132). In this regard, if the file name is an archive file, the content data is read from a file group archived in the archive file. Next, the local server unit 14a returns a response (an HTTP response) including the read content data to the Web application 13a (S133). In this regard, the acquisition request in step S121 may include the cookie set in the Web application 13a. If the cookie matches the cookie set in the local server unit 14a, the local server unit 14a may return the content data.

When the Web application 13a receives the content data (S122), the Web application 13a displays the image of the Web application 13a based on the content data (S123). Next, the Web application 13a starts cooperation processing with the gadget 30 (S124).

Figure 5:
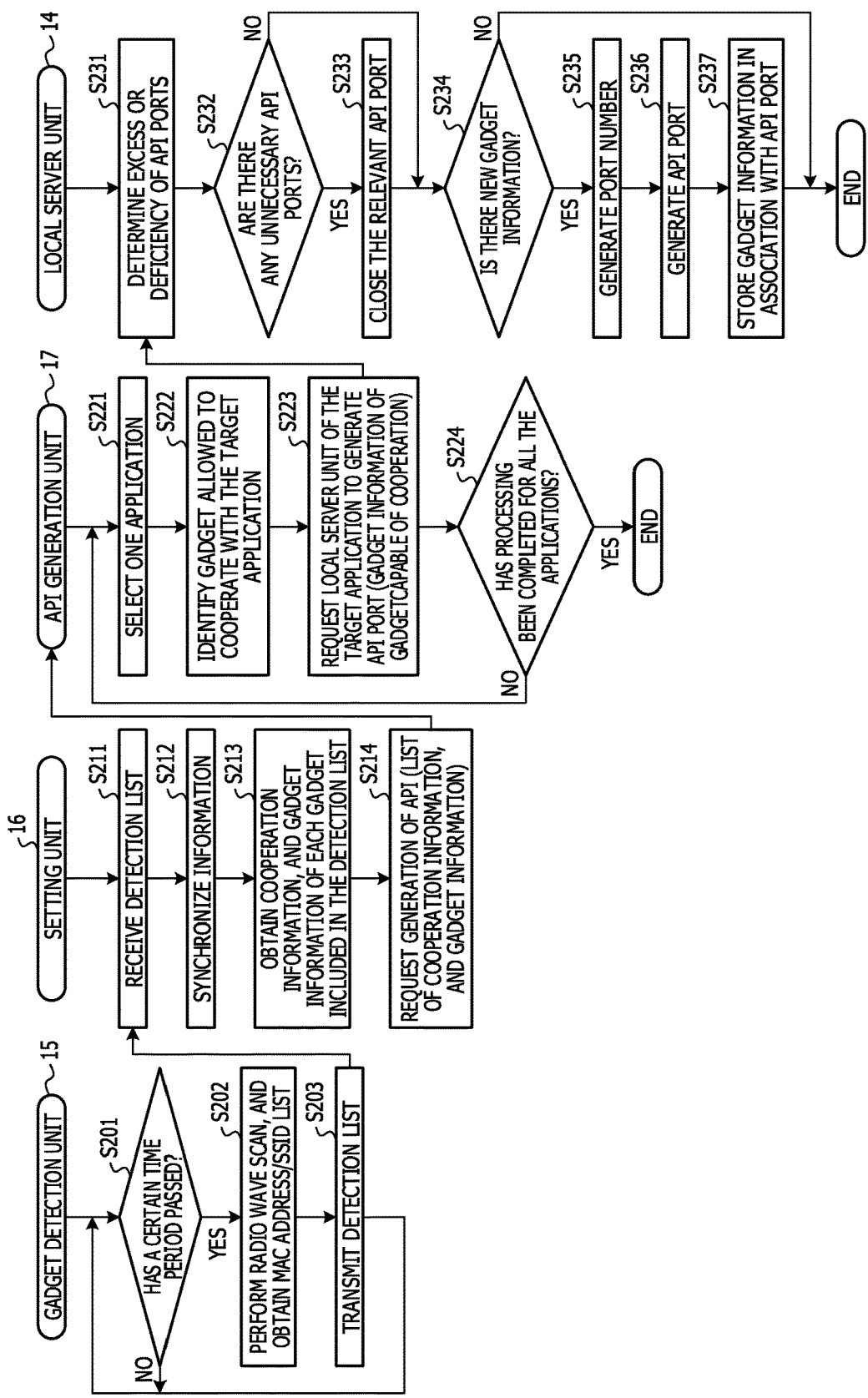
FIG. 5 is an explanatory diagram of an example of a processing procedure executed when a gadget is detected.

Next, a description will be given of the processing procedure executed in response to detection of the gadget 30. FIG. 5 is an explanatory diagram of an example of a processing procedure executed when a gadget is detected.

The gadget detection unit 15 performs radio wave scan (S202) every time a certain time period passes (Yes in S201). As a result, a list of the SSID and the MAC address, and the like (hereinafter referred to as a "detection list") detected by the radio wave scan for each gadget 30 is obtained. Next, the gadget detection unit 15 transmits a detection list to the setting unit 16 (S203).

FIG. 6 is a diagram illustrating an example of the detection list. As illustrated in FIG. 6, the detection list includes an SSID and a MAC address for each of detected gadgets 30. However, for a gadget 30 that has been detected by a communication method not using an SSID, such as BlueTooth (registered trademark), or the like, an SSID is not included.

When the setting unit 16 receives a detection list (S211), the setting unit 16 obtains synchronization on the cooperation information and the gadget list information with the cooperation management server 20 (S212). That is to say, the setting unit 16 transmits an acquisition request of the cooperation information and the gadget list information including the terminal ID of the user terminal 10 to the cooperation management server 20. The terminal ID is identification information for each of the user terminals 10, and is stored in the auxiliary storage device 103, for example. The information transmission unit 21 in the cooperation management server 20 returns the cooperation information corresponding to the user terminal 10 out of the cooperation information stored in the cooperation information storage unit 24.

FIG. 7 is a diagram illustrating an example of a configuration of a cooperation information storage unit. As illustrated in FIG. 7, the cooperation information storage unit 24 stores information indicating the gadget 30 with which the user terminal 10 related to the terminal ID is allowed to cooperate in association with each terminal ID. That is to say, a cell in which "○" is recorded indicates that all the Web applications 13 of the user terminal 10 related to the row to which the cell belongs are allowed to cooperate with the gadget 30 related to the column to which the cell belongs. Also, a cell in which "○ (only XXX)" is recorded indicates that only the Web application 13 corresponding to "XXX" is allowed to cooperate with the gadget 30 related to the column to which the cell belongs among the Web applications 13 of the user terminal 10 related to the row to which the cell belongs. In this regard, identification information of a plurality of Web applications 13 may be enumerated in "XXX". Also, a cell in which "X" is recorded indicates that all the Web applications 13 of the user terminal 10 related to the row to which the cell belongs are not allowed to cooperate with the gadget 30 related to the column to which the cell belongs.

In step S212, the information transmission unit 21 returns the cooperation information related to the row corresponding to the terminal ID included in the information acquisition request.

Also, FIG. 8 is a diagram illustrating an example of a configuration of a gadget list storage unit. As illustrated in FIG. 8, the gadget list storage unit 25 stores gadget information for each gadget 30. The gadget information includes a gadget name, an SSID, a password, a MAC address, a connection method, a driver name, and the like.

The gadget name is an identification name of the gadget 30. However, the gadget name may not be included in the gadget information. The SSID is an SSID for the gadget 30. The password is a password for the gadget 30. The MAC address is a MAC address of the gadget 30. The connection method is a connection method with the gadget 30 in wireless communication. In this regard, "BLT" in the connection method represents BlueTooth (registered trademark). The driver name is a file name of the file that stores a driver. The driver is a program code for causing the Web application to invoke an API port, and for transmitting requisite information for invoking an API published by the gadget 30 to the local server unit 14 as a result. In the present embodiment, the driver is implemented by JavaScript (registered trademark).

In step S212, the information transmission unit 21 returns a list of gadget information stored in the gadget list storage unit 25, and the file of the driver identified by the driver name of each gadget information. In this regard, an acquisition request from the user terminal 10 may include a list of the SSIDs or MAC addresses of the detected gadget 30. The information transmission unit 21 may return only the gadget information and the driver corresponding to the SSID or the MAC address.

The setting unit 16 stores the returned cooperation information into the cooperation information cache unit 111, and stores the returned gadget list information and the driver group into the gadget list cache unit 112.

In this regard, before the cooperation information and the gadget list information are returned, the terminal authentication unit 22 refers to the terminal information storage unit 23, and performs authentication that is related to the acquisition request. If the authentication has succeeded, the cooperation information and the gadget list information are returned.

FIG. 9 is a diagram illustrating an example of a configuration of a terminal information storage unit. As illustrated in FIG. 9, the terminal information storage unit 23 stores an authentication method and authentication information in association with a terminal ID. The authentication method indicates a method of authentication. The authentication information is information used in authentication based on the authentication method. For example, in the example illustrated in FIG. 9, verification is performed whether a Rivest Shamir Adleman (RSA) key possessed by the user terminal 10 corresponds to a public key recorded in the authentication information or not by challenge & response.

Next, the setting unit 16 obtains cooperation information from the cooperation information cache unit 111, and obtains gadget information corresponding to each SSID or each MAC address included in the detection list from the gadget list cache unit 112 (S213). That is to say, gadget information of the detected gadget 30 is obtained. In this regard, here, the file of the driver may not be obtained. Next, the setting unit 16 requests the API generation unit 17 to generate an API corresponding to the gadget 30 (S214). In the request, the cooperation information obtained in step S213, and a list of gadget information is specified.

Next, the API generation unit 17 executes the processing in steps S221 to S223 for each started Web application 13. In step S221, the API generation unit 17 selects one Web application 13 to be processed among the started Web applications 13. In the following, the selected Web application 13 is referred to as a "target application". Next, the API generation unit 17 identifies a gadget name for each gadget 30 allowed to cooperate with the target application based on the cooperation information specified in the API generation request (S222). Next, the API generation unit 17 requests the local server unit 14 corresponding to the target application to generate an API port (S223). The request includes gadget information corresponding to each gadget name identified in step S222. In this regard, a file storing the driver may not be included in the request.

Each local server unit 14 determines whether there is an excess or a deficiency of API ports in response to a generation request of an API port (S231). That is to say, the processing in step S231 is executed for each certain period of time in synchronism with the processing in step S202 by the gadget detection unit 15. Accordingly, there are cases where an API port was generated for a gadget 30 that had been detected until the last time. Also, a list of gadgets 30 detected the last time and a list of gadgets 30 detected this time might be different. Also, the processing in step S212 by the setting unit 16 is executed for each certain period of time in synchronism with the processing in step S202. Accordingly, the gadgets 30 allowed to cooperate with each Web application 13 might be different between at the previous detection time, and at this detection time. The cooperation information might be updated by a system administrator.

Thus, in step S231, a comparison is made between the gadget information corresponding to each API port generated already, and a list of gadget information specified in the generation request of an API port, and identification is made of the gadget information included only in the latter, and the gadget information included only in the former. The gadget information included only in the former is the information of the gadget 30 newly detected, or the gadget 30 newly allowed cooperation. Also, the gadget information included only in the former is information of the gadget 30 that has become undetected, or information of the gadget 30 newly prohibited cooperation. The API port corresponding to the gadget information is an unnecessary API port.

If there is an unnecessary API port (Yes in S232), the local server unit 14 individually closes the relevant API ports (S233). Also, if there is new gadget information (Yes in S234), the local server unit 14 generates the port numbers corresponding to the respective new gadget information (S235). The port number ought to be a port that has been generated by the local server unit 14, and ought to be a value not duplicated with a port number of a valid port at this point in time. Also, if a plurality of port numbers are generated in step S235, the individual port numbers that are generated ought to be values that are not duplicated with each other. Next, the local server unit 14 generates an API port for each of the port numbers generated in step S235 (S236). At this time, the same IP address as the IP address of the server port of the local server unit 14 is assigned to each API port to be generated. Next, the local server unit 14 stores the gadget information corresponding to the API port in association with the API port generated in step S236 into the memory 102, for example (S237).

Figure 10:
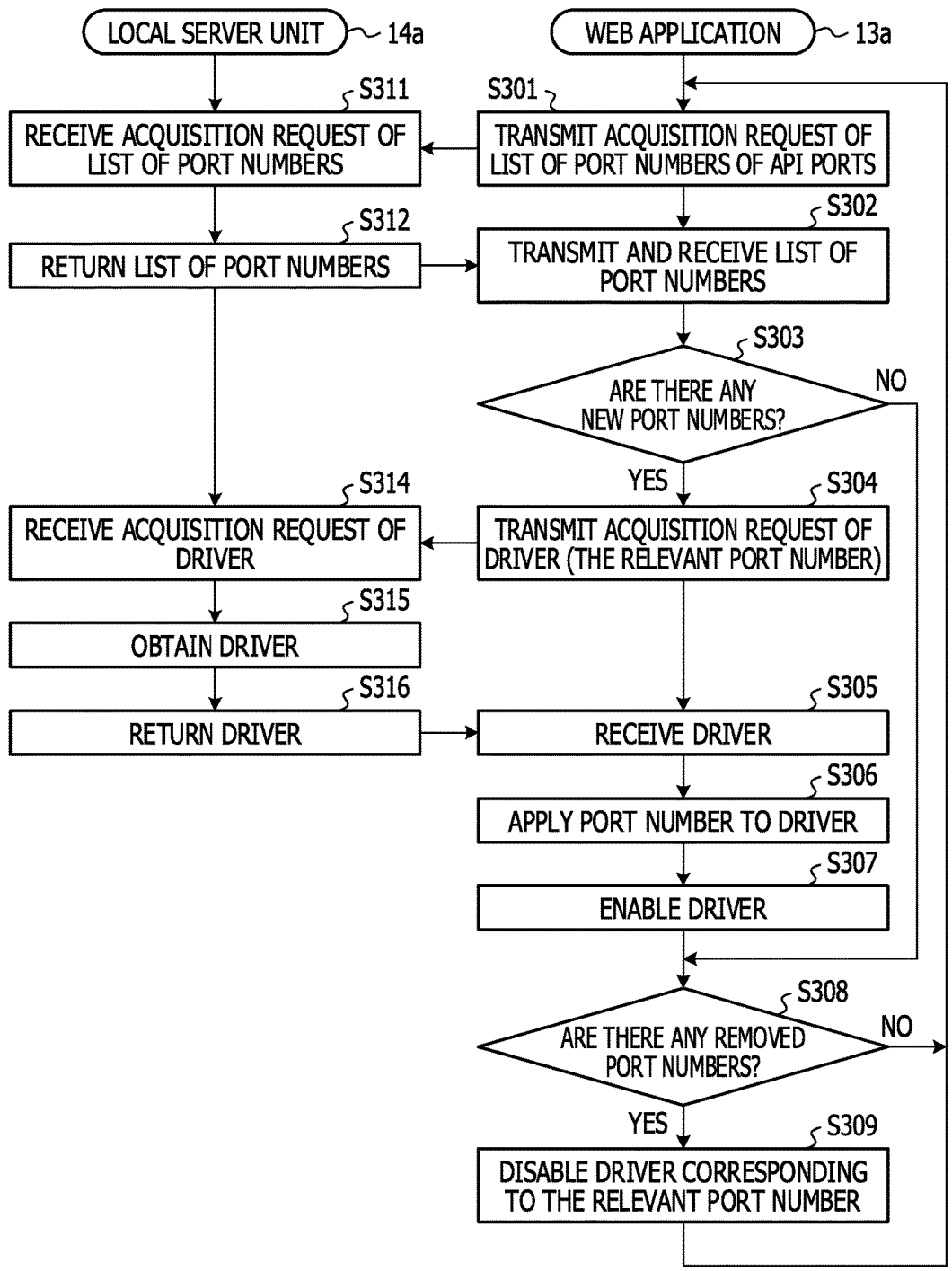
FIG. 10 is an explanatory diagram of an example of a processing procedure of first cooperation processing.

Next, a detailed description will be given of the processing of step S124 in FIG. 4. FIG. 10 is an explanatory diagram of an example of a processing procedure of first cooperation processing. FIG. 10 is the processing that is executed subsequently to the processing of step S123 in FIG. 4, and thus it is assumed that the Web application 13 in FIG. 10 is the Web application 13a for the sake of convenience. However, the processing procedure illustrated in FIG. 10 is executed by each of the Web applications 13 that has been started and the local server unit 14 corresponding to the respective Web application 13 in parallel.

In step S301, the Web application 13a transmits an acquisition request (HTTP request) of a list of the port numbers of the API ports to the server port of the local server unit 14a. When the local server unit 14a receives the acquisition request through the server port (S311), the local server unit 14a returns a response (HTTP request) including the port number of each API port that has been currently opened by the local server unit 14a (S312). If a plurality of API ports are open, a plurality of port numbers are returned. In this regard, the acquisition request in step S311 may include a cookie set in the Web application 13a. The local server unit 14a may return a port number if that cookie matches the cookie set in the local server unit 14a itself.

Next, the Web application 13a determines whether there are port numbers not included in a list of the port numbers received in the previous processing of step S302 among a list of the port numbers received in this time processing of step S302 (S302). That is to say, a determination is made of whether there is a gadget 30 that has newly been permitted cooperation. If there is no relevant port number (No in S303), the processing proceeds to step S308. If there is a relevant port number (Yes in S303), the Web application 13a transmits an acquisition request (HTTP request) of a driver for the gadget 30 corresponding to the port number to the server port of the local server unit 14a (S304). The acquisition request includes the relevant port number. If there are a plurality of relevant port numbers, a plurality of port numbers are included in the acquisition request.

When the local server unit 14a receives the acquisition request through the server port (S314), the local server unit 14a obtains (reads) the driver corresponding to the port number for each port number included in the acquisition request from the gadget list cache unit 112 (S315). It is possible to identify a driver corresponding to the port number of a certain API port based on the driver name included in the gadget information stored in the memory 102 in association with the API port. Next, the local server unit 14a returns a response (HTTP response) including the obtained each driver to the Web application 13a (S316). The Web application 13a receives the response (S305).

FIG. 11 is a diagram illustrating an example of definition contents of a driver. In FIG. 11, a driver 510 is a driver that supports the gadget 30, which is a lens camera capable of wireless fidelity (WiFi) (registered trademark).

In the driver 510, a description 511 indicates assignment (substitution) of the port number of the API port to the variable port. However, in the description 511, the port number to be assigned is expressed by a variable. That is to say, in the present embodiment, "$PORT$" is a keyword indicating a part to be replaced (substituted) by the port number of the API port assigned to the driver 510 (part to which the port number is applied). The reason why the port number is expressed by a variable is that a creator of the driver 510 is not allowed to know the port number at the time of creating the driver 510.

A description 512 indicates that the method name of one method out of the method group that accesses the API port supporting the gadget 30 corresponding to the driver 510 is "Takephoto". A description 513 indicates that the access destination when the method is executed is the URL specified in parentheses. In the URL, in the portion of <API1 published by the gadget>, the method name of the API of the gadget 30 to be invoked by the local server unit 14 in accordance with an access to the API port is specifically described in reality. Also, in the description 513, "IP( )" is a function that obtains the IP address of the Web application 13 that executes the script from the environment variable of the browser unit 12 (Web browser) at the time of executing the driver 510 (script). That is to say, "IP( )" is replaced by the IP address of the Web application 13a at the time of executing the driver 510. Accordingly, a definition that the API port generated by the local server unit 14 for the gadget 30 corresponding to the driver 510 is the access destination is given in the description 513.

A description 514 indicates that the information in parentheses is transmitted to the access destination specified in the description 513. In the parentheses, in reality, a character string indicating the argument for "API1 published by the gadget 30" is specifically described.

Descriptions 522, 523, and 524 are the same definition as the descriptions 512, 513, and 514. However, the descriptions 522 to 524 are the definitions of the method of the driver 510 supporting the API (method of the gadget 30) that is different from the API (method of the gadget 30) supported by the descriptions 512 to 514.

Next, the Web application 13a applies the port number corresponding the driver to each of the received drivers (S306). That is to say, the part of "$PORT$" is replaced by the port number corresponding to the driver in each driver. In this regard, IP( ) in the description 513 of the driver 510 may be described by a keyword, such as "$IP$", or the like, for example. That is to say, the IP address may be expressed by a variable. In this case, the Web application 13a replaces "$IP$" of the driver 510 by the IP address set in the Web application 13a.

Next, the Web application 13a validates the driver (S307). That is to say, the script as the driver is read into the memory 102 as a component of the Web application 13a. As a result, an icon for accepting the execution instruction of the driver from a user may be displayed on the display device 111, for example.

FIG. 12 is a diagram illustrating a display example of icons corresponding to gadgets, respectively. In FIG. 12, a display example of the case where the gadget 30a, which is a lens camera capable of WiFi (registered trademark), and the gadget 30b, which is an SD card capable of WiFi (registered trademark), are detected, and the corresponding drivers are validated. In this case, an icon c1 and an icon c2 which correspond to the respective drivers fall from the upper side of the screen, and are displayed on the lower side of the screen, for example.

Next, the Web application 13a determines whether there are port numbers not included in a list of the port numbers received in this time processing of step S302 among a list of the port numbers received in the previous time processing of step S302 (S308). That is to say, a determination is made of whether there is a gadget 30 that has become unpermitted to cooperate. If there is a relevant port number (Yes in S308), the Web application 13a disables the driver corresponding to the port number (S309). For example, the driver loaded in the memory 102 as a component of the Web application 13a is deleted from the memory 102. As a result, the icon corresponding to the driver is also deleted.

FIG. 13 is a diagram illustrating an example in which an icon is deleted when a corresponding driver is disabled. In FIG. 13, an example in which the icon c1 corresponding to the gadget 30a is deleted as a result that the gadget 30a has become undetected.

In this regard, in FIG. 10, the processing of step S301 and the subsequent processing is repeatedly executed. For example, the processing of step S301 and the subsequent processing may be executed at certain time intervals.

Figure 14:
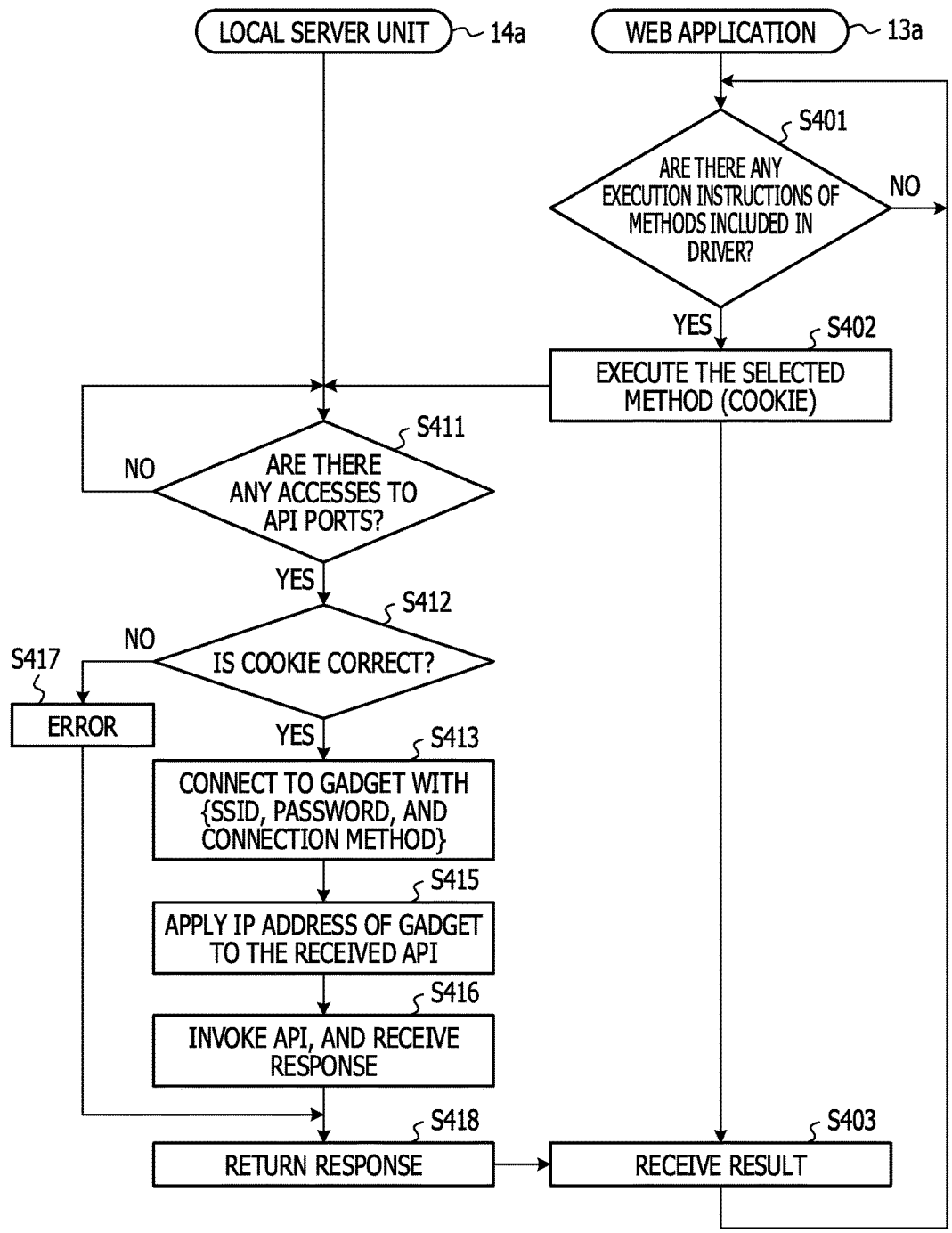
FIG. 14 is an explanatory diagram of an example of a processing procedure of second cooperation processing.

Next, in step S124 in FIG. 4, a description will be given of the processing executed in parallel with the processing in FIG. 10. FIG. 14 is an explanatory diagram of an example of a processing procedure of second cooperation processing.

When the Web application 13a detects that an icon of the driver has been operated, and that an execution instruction of any one of methods is input out of the methods included in the driver (Yes in S401), the Web application 13a executes the selected method (S402).

Figure 15:
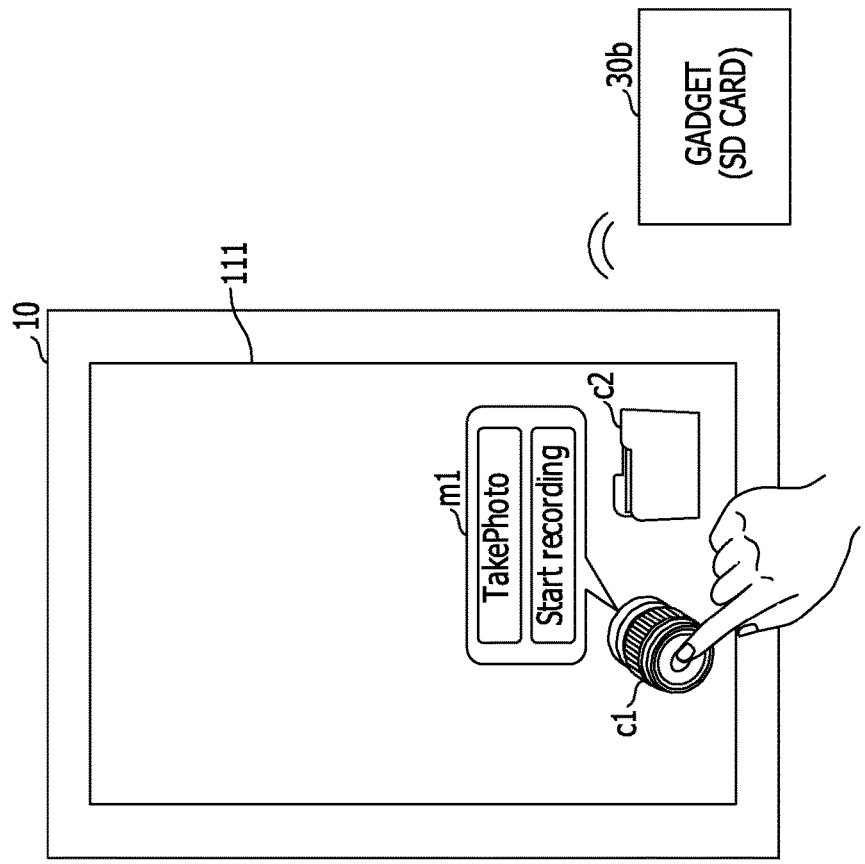
FIG. 15 is a diagram illustrating an example of operation of an icon of a driver.

FIG. 15 is a diagram illustrating an example of operation of an icon of a driver. In FIG. 15, an example, in which the icon c1 is selected and a menu m1 is displayed, is illustrated. The menu m1 includes individual methods included in the driver 510 corresponding to the icon c1 as respective menu items. That is to say, the menu m1 includes the "TakePhoto" method and the "Startrecording" method as the menu items. A user is allowed to select a desired method in order to input an execution instruction of the method.

Next, the Web application 13a executes the script defined in the selected method (S402). For example, if "Take-Photho" is selected, the descriptions 511 to 514 in the driver 510 in FIG. 11 is executed. As a result, an HTTP request including <argument of API1 published by the gadget 30> is transmitted to the path of <API1 published by the gadget 30> of the API port related to the port number corresponding to the driver 510 among the API ports of the local server unit 14a. In this regard, the HTTP request includes the cookie set for the Web application 13a.

When the local server unit 14a receives the HTTP request through any one of the API ports out of the open API ports (Yes in S411), the local server unit 14a verifies the validity of the cookie included in the HTTP request (S412). Specifically, the cookie held by the local server unit 14a is compared with the cookie included in the HTTP request. As a result of the comparison, if both of the cookies differ (No in S412), the local server unit 14a detects the occurrence of an error (S417). In this case, the local server unit 14a returns the HTTP response indicating an error in step S417.

On the other hand, if both of the cookies match (Yes in S412), it is confirmed that the transmission source of the HTTP request is the Web application 13a. Thus, the local server unit 14a establishes a connection with the gadget 30 related to the SSID or the MAC address using the SSID or the MAC address, and the password, and the like included in the gadget information stored in association with the API port accessed in step S411 in accordance with the connection method included in the gadget information through wireless communication (S413). As a result, the IP address of the gadget 30 is determined. Thus, the local server unit 14a applies the IP address of the gadget 30 to the API of the gadget 30, which is identified based on the HTTP request received in step S411 (S415). Accordingly, even if an IP address of the gadget 30 changes each time a connection is established between the user terminal 10 and the gadget 30, an IP address assigned to the gadget 30 in each connection is applied to the API of the gadget 30.

Next, the local server unit 14a invokes the API of the gadget 30 so as to transmit a request to the gadget 30, and receives a response to the request from the gadget 30 (S416). The contents of the request differs depending on the gadget 30 and the invoked API. If the API that requests for capturing an image is invoked to a lens camera capable of WiFi (registered trademark), image data as an image capture result may be included in the response. If the API that requests for reading information is invoked to an SD card capable of WiFi (registered trademark), the read information may be included in the response.

Next, the local server unit 14a returns an HTTP response to the HTTP request received in step S411 (S418). The HTTP response includes the response from the gadget 30. When the Web application 13a receives the HTTP response (S403), the Web application 13a executes the processing using the response from the gadget 30, which is included in the HTTP response, for example.

As described above, with the present embodiment, an API (WebAPI) of the gadget 30 is disposed within the same domain as that of the Web application 13. Accordingly, even if the access destination of the Web application 13 is restricted by CSP, it is possible for the Web application 13 to invoke the API by the same origin policy. As a result, it is possible to facilitate cooperation between the Web application 13 and the gadget 30.

Also, IP addresses that are different one another are assigned to the individual Web applications 13. Accordingly, it becomes difficult for each Web application 13 to access the API port of the local server unit 14 corresponding to the other Web application 13. It is difficult for each Web application 13 to know the IP address of the other Web application 13, and it is prohibited for each Web application 13 to access the IP address of the other Web application 13 by the restriction of CSP, the same origin policy, or the like. As a result, it becomes difficult for each Web application 13 to access the gadget 30 to which access is not allowed by the Web application 13 itself. That is to say, it is possible to make an accessible gadget 30 different for each Web application 13.

Further, as illustrated in step S412 in FIG. 14, when each Web application 13 invokes an API of a gadget 30, the local server unit 14 determines the validity of the invoking-source Web application 13. By such a mechanism, it becomes difficult for each Web application 13 to access a gadget 30 to which access is not allowed by the Web application 13 itself.

Also, in the present embodiment, a driver for each gadget 30 is created in advance, and the driver is dynamically added as a component of the Web application 13. Accordingly, it becomes possible for an existing Web application 13, in which the definition on the cooperation with a gadget 30 is not implemented, to cooperate with the driver.

To put it in another way, the Web application 13 may include a script having an identical definition to a driver as a component. In this case, the processing (S304, S305, S307, S309, and the like in FIG. 10) for incorporating the driver into the Web application 13 may not be executed. In step S306, the port number ought to be applied to the cooperation part with the gadget 30 in the definition of the Web application 13.

Also, the local server unit 14 does not have to be started for each Web application 13. For example, one of the local server units 14 may generate a server port having a different IP address for each Web application 13, and may generate an API port having a different IP address for each Web application 13. By doing so, it is also possible to distinguish the domain of each Web application 13.

Also, it has been assumed that the present embodiment is applied to a use scene in a company, but the present embodiment may be applied to an individual use. In this case, the information related to the user terminal 10 may be stored in the cooperation information cache unit 111 and the gadget list cache unit 112 in advance without disposing the cooperation management server 20. In this case, access permission by each Web application 13 to each gadget 30 may be set by a user of the user terminal 10.

In this regard, in the present embodiment, the user terminal 10 is an example of the information processing apparatus. The API generation unit 17 is an example of the identification unit. The local server unit 14 is an example of the generation unit and the transmission unit. The application start unit 11 is an example of the assigning unit. The port number is an example of the identification information of interface.

In the above, a detailed description has been given of the embodiments of the present disclosure. However, the present disclosure is not limited to such specific embodiments described above, and it is possible to make various modifications and changes within the spirit and the scope of the appended claims of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing method executed by a computer, the processing method comprising:
    starting one or more network applications;
    starting a security application that prevents accesses from the one or more network applications to one or more destinations, wherein the one or more destinations do not belong to a first network domain and do not have an address to which an access is allowed for the network application;
    performing a detecting operation of one or more peripheral devices to be accessed by the one or more network applications;
    comparing, based on the detecting operation, the detected one or more peripheral devices as a first group with one or more other peripheral devices which are detected in a previous detecting operation as a second group;
    closing, when there are one or more peripheral devices which belong to only the second group, one or more second interfaces corresponding to the one or more peripheral devices which belong to only the second group; and
    generating, when there are one or more peripheral devices which belong to only the first group, one or more first interfaces corresponding to the one or more peripheral devices which belong to only the first group, the one or more network applications being configured to access the one or more peripheral devices via the one or more first interfaces.

2. The information processing method according to claim 1, further comprising:
    obtaining each association of each network application and each peripheral device to which each network application is permitted to access in the computer, wherein
    the first interface is generated based on each obtained association.

3. The information processing method according to claim 1, wherein
    one of the detected one or more peripheral devices has an IP address belonging to a second network domain different from the first network domain.

4. The information processing method according to claim 1, further comprising
    starting a server application that belongs to the first network domain as one of the one or more network applications, wherein
    one of the one or more first interfaces is provided on the server application so as to have a port number for accepting accesses from one of the one or more network applications to the detected peripheral device.

5. The information processing method according to claim 4, further comprising:
    starting a web browser application as another one of the one or more network applications, wherein
    the one or more network applications are web applications,
    a program code of the web application is provided by the server application, and
    the web browser executes the program code of the web application obtained from the server application.

6. The information processing method according to claim 4, wherein
    an IP address of the server application associating with one of the one or more first interfaces is different from another IP address of another server application associating with another one of the one or more first interfaces.

7. The information processing method according to claim 1, wherein
    one of the one or more first interfaces for accessing to one of the one or more detected peripheral devices is different from another one of the one or more first interfaces for accessing to another one of the one or more detected peripheral devices.

8. The information processing method according to claim 1, further comprising:
    obtaining an access program code for accessing to one of the one or more detected peripheral devices, the access program code including a specified variable for designating one of the one or more first interfaces to the one of detected one or more peripheral devices, wherein one of the one or more network applications is allowed to access to the one of the one or more detected peripheral devices by using the access program code in which an identifier of the generated interface is substituted for the specified variable.

9. A processing apparatus comprising:
a memory; and
a processor coupled to the memory and configured to:
  start one or more network applications,
  start a security application that prevents accesses from the one or more network applications to one or more destinations, wherein the one or more destinations do not belong to the first network domain and do not have an address to which an access is allowed for the one or more network applications,
  perform a detecting operation of one or more peripheral devices to be accessed by the one or more network applications,
  compare, based on the detecting operation, the detected one or more peripheral devices as a first group with one or more other peripheral devices which are detected in a previous detecting operation as a second group,
  close, when there are one or more peripheral devices which belong to only the second group, one or more second interfaces corresponding to the one or more peripheral devices which belong to only the second group, and
  generate, when there are one or more peripheral devices which belong to only the first group, one or more first interface corresponding to the one or more peripheral devices which belong to only the first group, the one or more network applications being configured to access the one or more peripheral devices via the one or more first interfaces.

10. A non-transitory computer-readable storage medium storing a program that causes a computer to execute a process, the information processing device including a memory, the process comprising:
  starting one or more network applications;
  starting a security application that prevents accesses from the one or more network applications to one or more destinations, wherein the one or more destinations do not belong to the first network domain and do not have an address to which an access is allowed for the one or more network applications;
  performing a detecting operation of one or more peripheral devices to be accessed by the one or more network applications;
  comparing, based on the detecting operation, the detected one or more peripheral devices as a first group with one or more other peripheral devices which are detected in a previous detecting operation as a second group;
  closing, when there are one or more peripheral devices which belong to only the second group, one or more second interfaces corresponding to the one or more peripheral devices which belong to only the second group; and
  generating, when there are one or more peripheral devices which belong to only the first group, one or more first interface, the one or more network applications being configured to access the one or more peripheral devices via the one or more first interfaces.

* * * * *